United States Patent
Ding

(10) Patent No.: US 10,861,139 B2
(45) Date of Patent: Dec. 8, 2020

(54) METHOD AND SYSTEM FOR HANDLING IMAGES

(71) Applicant: Volvo Car Corporation, Gothenburg (SE)

(72) Inventor: Sihao Ding, Mountainview, CA (US)

(73) Assignee: Volvo Car Corporation, Göteborg (SE)

( * ) Notice: Subject to any disclaimer, the term of this patent is extended or adjusted under 35 U.S.C. 154(b) by 16 days.

(21) Appl. No.: 16/158,829

(22) Filed: Oct. 12, 2018

(65) Prior Publication Data

US 2019/0130540 A1 May 2, 2019

(30) Foreign Application Priority Data

Nov. 1, 2017 (EP) .................................... 17199505

(51) Int. Cl.
*G06T 5/00* (2006.01)
*G06K 9/00* (2006.01)
(Continued)

(52) U.S. Cl.
CPC ................ *G06T 5/006* (2013.01); *B60R 1/00* (2013.01); *G06K 9/00825* (2013.01);
(Continued)

(58) Field of Classification Search
CPC ..... G06T 5/006; G06T 3/0018; G06T 3/0062; G06T 3/4038; B60R 1/00; B60R 2300/10; B60R 2300/802; G06K 9/00825
See application file for complete search history.

(56) References Cited

U.S. PATENT DOCUMENTS

| 5,550,677 A | 8/1996 | Schofield et al. |
| 5,670,935 A | 9/1997 | Schofield et al. |

(Continued)

FOREIGN PATENT DOCUMENTS

| CN | 101809993 A | 8/2010 |
| KR | 20090044163 A | * 5/2009 |

(Continued)

OTHER PUBLICATIONS

Feb. 9, 2018 European Search Report issue on International Application No. EP17199505.

(Continued)

*Primary Examiner* — Khai M Nguyen
(74) *Attorney, Agent, or Firm* — Clements Bernard Walker; Christopher L. Bernard

(57) ABSTRACT

A method performed by a vehicle system for handling images of surroundings of a vehicle. An image of surroundings of the vehicle is obtained. The image is obtained from at least one image capturing device mounted in or on the vehicle, and the image capturing device comprises a fisheye lens. At least a part of distortions in the image is corrected to obtain a corrected image. The corrected image is rotationally transformed using a first rotational transformation to obtain a first transformed image. The corrected image is rotationally transformed using a second rotational transformation to obtain a second transformed image. The first and second rotational transformations are different from each other, and the first and second transformed images are consecutive images.

9 Claims, 12 Drawing Sheets

(51) Int. Cl.
  *B60R 1/00* (2006.01)
  *G06T 3/00* (2006.01)
  *G06T 3/40* (2006.01)

(52) U.S. Cl.
  CPC .......... *G06T 3/0018* (2013.01); *G06T 3/0062* (2013.01); *G06T 3/4038* (2013.01); *B60R 2300/10* (2013.01); *B60R 2300/802* (2013.01)

(56) References Cited

U.S. PATENT DOCUMENTS

| | | | |
|---|---|---|---|
| 6,104,288 A | | 8/2000 | Hopkins |
| 6,476,855 B1* | 11/2002 | Yamamoto | ................ B60R 1/00 348/148 |
| 6,611,202 B2* | 8/2003 | Schofield | ............... B60N 2/002 340/461 |
| 7,161,616 B1* | 1/2007 | Okamoto | .................. B60R 1/00 348/148 |
| 10,110,820 B2* | 10/2018 | Oba | .................... G06F 3/04845 |
| 2012/0069187 A1* | 3/2012 | Ozaki | ....................... B60R 1/00 348/148 |
| 2015/0062292 A1 | 3/2015 | Kweon | |
| 2016/0114728 A1* | 4/2016 | Tan | ........................... B60R 1/00 348/148 |
| 2017/0026572 A1 | 1/2017 | Baran | |
| 2017/0232896 A1* | 8/2017 | Bassi | ....................... B60R 1/00 348/148 |
| 2017/0307857 A1* | 10/2017 | Ning | ....................... G02B 9/62 |
| 2020/0010019 A1* | 1/2020 | Matsuba | ................... G06T 3/00 |

FOREIGN PATENT DOCUMENTS

| | | |
|---|---|---|
| KR | 20160051377 A * | 5/2016 |
| WO | 0168540 A2 | 9/2001 |

OTHER PUBLICATIONS

Office Action issued in the corresponding CN application No. 201811294618.8.

\* cited by examiner

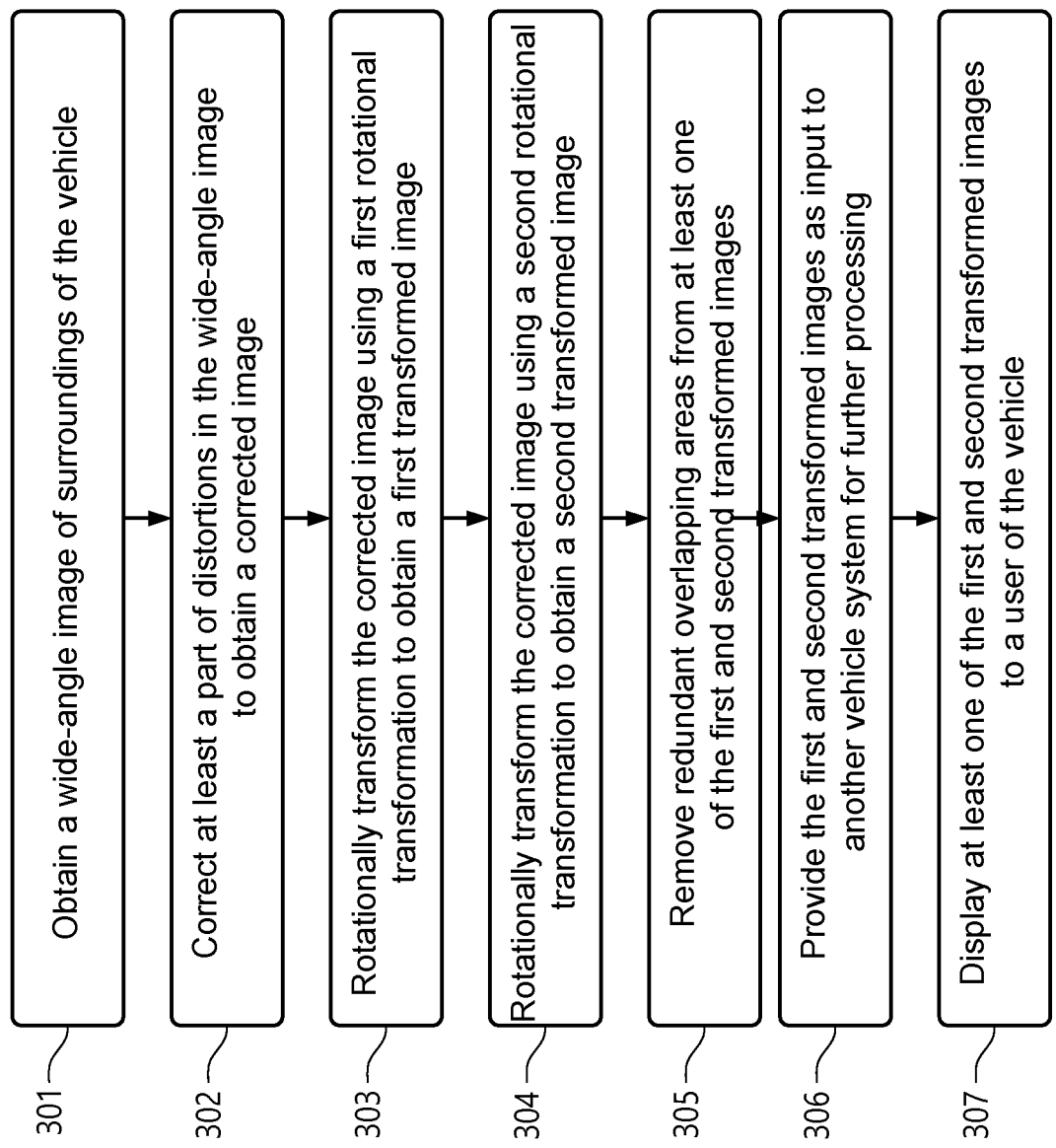

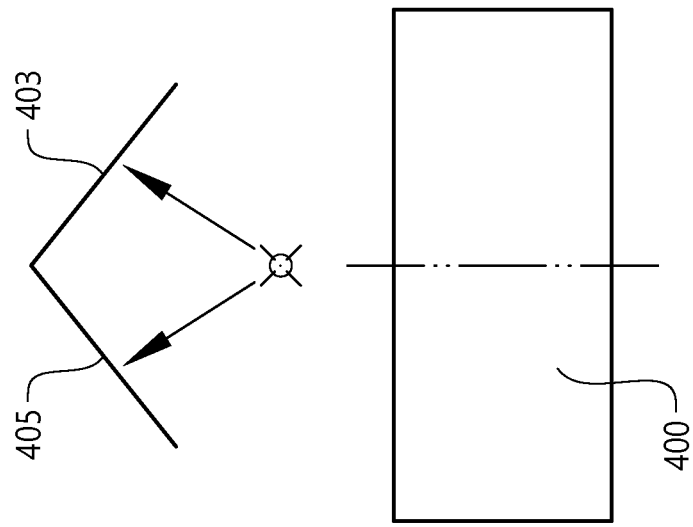
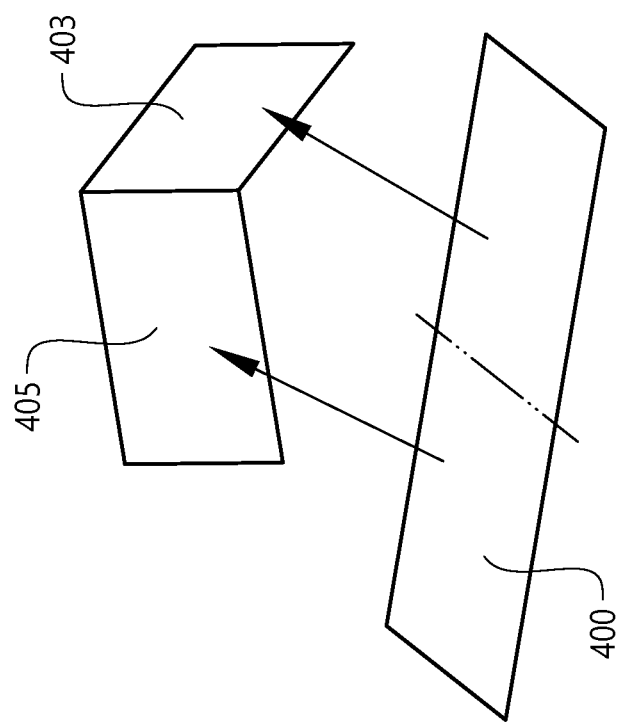
FIG. 4b
FIG. 4a

METHOD AND SYSTEM FOR HANDLING IMAGES

CROSS-REFERENCE TO RELATED APPLICATION

The present patent application/patent claims the benefit of priority of co-pending European Patent Application No. 17199505.3, filed on Nov. 1, 2017, and entitled "METHOD AND SYSTEM FOR HANDLING IMAGES," the contents of which are incorporated in full by reference herein.

TECHNICAL FIELD

Embodiments herein relate generally to a vehicle system and a method performed by the vehicle system. More particularly the embodiments herein relate to handling images of surroundings of a vehicle.

BACKGROUND

Use of cameras to obtain surrounding view of vehicles is common and known. For example, U.S. Pat. No. 5,670,935 discloses a vehicle having two image capture devices positioned on the vehicle and directed rearwardly with respect to the direction of travel of the vehicle.

A display combines the captured images into an image that would be achieved by a single rearward-looking camera having a view unobstructed by the vehicle. Algorithms and systems for (auto-) camera calibration for such cameras settings also exist.

A regular lens, also referred to as a rectilinear lens, is a lens where straight lines are reproduced as straight lines. A fisheye lens, also referred to as a curvilinear lens or an omnidirectional lens, is the opposite of a rectilinear lens and reproduces straight lines as curved lines, i.e. it gives a convex non-rectilinear appearance.

The front of the fisheye lens has a cupola or domed shaped front end, and has its name from being similar to an eye on a fish. A fisheye lens is an example of a, panoramic or hemispherical lens that has a field of view which is e.g. 180°, 220° or 360°. A fisheye lens can see wider than a rectilinear lens, and has the capability of capturing large dimensions of a specified area in one shot. Instead of producing images with straight lines of perspective (rectilinear images), the fisheye lens produces images with convex non-rectilinear appearance. Thus, a fisheye lens camera provides image with altered views, i.e. with a visual distortion. There are several types of fisheye lenses such as e.g. a circular fisheye lens, a full-frame fisheye lens, a panomorph fisheye lens, an omni-directional camera etc.

Fisheye lens cameras are widely used as visual sensor for Advanced Driver Assistance Systems (ADAS) and Automated Driving (AD) because of their good coverage (field-of-view). However, this comes with costs: the unnatural images caused by huge distortion especially at the outer edge of the images. It not only brings difficulty for human drivers to understand some of the content, but also causes problems for ADAS and/or AD software that process these images. Most computer vision and machine learning algorithms are designed for and trained on non-fisheye (i.e., the normal, undistorted ones) datasets, which makes them suboptimal or even fail when performing on highly distorted images captured by fisheye lens cameras.

Some existing conventional approaches undistort the images at the cost of losing a large portion of the cameras' field-of-view, which defeats the purpose to use fisheye lens cameras to begin with. A vehicle detection system is an example system which uses fisheye cameras for detecting vehicles. FIGS. 1*a* and 1*b* illustrate the example of the vehicle detection system, where FIG. 1*a* illustrates the vehicle detection system applying a distorted image and FIG. 1*b* illustrates the vehicle detection system applying an undistorted image. In more detail, they illustrate the enhancement of detection performance for Single Shot Detection (SSD) object detection algorithm for AD using the conventional fisheye lens undistortion method, which comes at the cost of losing a large portion of field-of-view. FIG. 1*a* illustrates the curvilinear image captured by a fisheye camera located at the side (flank) of the vehicle. The bounding boxes around two of the vehicles represents that they are the vehicles that are detected. The vehicles that do not have any bounding boxes around them are not detected by the vehicle detection system due to the distortions in the image. FIG. 1*b* illustrates the undistorted image where a large portion of the field-of-view is lost, but where all vehicles in the remaining field-of view are detected by the vehicle detection system (the detected vehicles are indicated with a bounding box around the vehicle). This FIGS. 1*a* and 1*b* serves the purpose of stating two facts: (1) Undistortion improves performance of software such as vehicle detection; (2) Undistortion reduces the field-of-view.

SUMMARY

An objective of embodiments herein is therefore to obviate at least one of the above disadvantages and to provide an improved vehicle system for handling images of the surroundings of a vehicle.

According to a first aspect, the object is achieved by a method performed by a vehicle system for handling images of surroundings of a vehicle. The vehicle system obtains an image of surroundings of the vehicle. The image is obtained from at least one image capturing device mounted in or on the vehicle. The image capturing device comprises a fisheye lens. The vehicle system corrects at least a part of distortions in the image to obtain a corrected image. The vehicle system rotationally transforms the corrected image using a first rotational transformation to obtain a first transformed image, and rotationally transforms the corrected image using a second rotational transformation to obtain a second transformed image. The first and second rotational transformations are different from each other, and the first and second transformed images are consecutive images.

According to a second aspect, the object is achieved by a vehicle system for handling images. The vehicle system is adapted to obtain an image of surroundings of the vehicle. The image is obtained from at least one image capturing device mounted in or on the vehicle. The image capturing device comprises a fisheye lens. The vehicle system is adapted to correct at least a part of distortions in the image to obtain a corrected image. The vehicle system is adapted to rotationally transform the corrected image using a first rotational transformation to obtain a first transformed image, and to rotationally transform the corrected image using a second rotational transformation to obtain a second transformed image. The first and second rotational transformations are different from each other, and the first and second transformed images are consecutive images.

According to a third aspect, the object is achieved by a vehicle comprising the vehicle system.

Thanks to the correction and the rotational transformations, an improved vehicle system for handling images of the surroundings of a vehicle has been provided. With the improved vehicle system, undistorted images are provided without losing much field-of-view of the image capturing device. Such images can be better used by both human beings (e.g. users of the vehicle) and other vehicle systems (Artificial Intelligence (AD/machine learning/computer vision algorithms for ADAS and AD).

Embodiments herein afford many advantages, of which a non-exhaustive list of examples follows:

One advantage of the embodiments herein is that they provide more natural and understandable views of distorted images. Such natural and understandable views can be better used by humans and computer programs.

Another advantage of the embodiments herein is that undistortion of the images is done without reducing too much field-of-view.

Furthermore, an advantage of the embodiments herein is that, for human beings, the images processed using the method herein become easier to understand. Specifically, they provide better sense of distance, size, shape, and orientation of objects and environment. Thus, the driving safety is enhanced.

Another advantage of the embodiments herein is that for computer programs (AI/machine learning/computer vision algorithms for ADAS and AD), the performance is improved. Thus, the driving safety is enhanced.

The embodiments herein are not limited to the features and advantages mentioned above. A person skilled in the art will recognize additional features and advantages upon reading the following detailed description.

BRIEF DESCRIPTION OF THE DRAWINGS

The embodiments herein will now be further described in more detail in the following detailed description by reference to the appended drawings illustrating the embodiments and in which:

FIG. 3 is a flow chart illustrating embodiments of a method.

FIG. 4a, 4b are schematic drawings illustrating a 2-fold form/pattern.

The drawings are not necessarily to scale and the dimensions of certain features may have been exaggerated for the sake of clarity. Emphasis is instead placed upon illustrating the principle of the embodiments herein.

DETAILED DESCRIPTION

The embodiments herein relate to a way of dewarping and undistortion of images (e.g. 180 degree images, 360-degree images) that enhances the visualizing of the view for a human vehicle user (e.g. a driver), as well as the performance of general computer vision and machine learning algorithms.

Figure 1A:
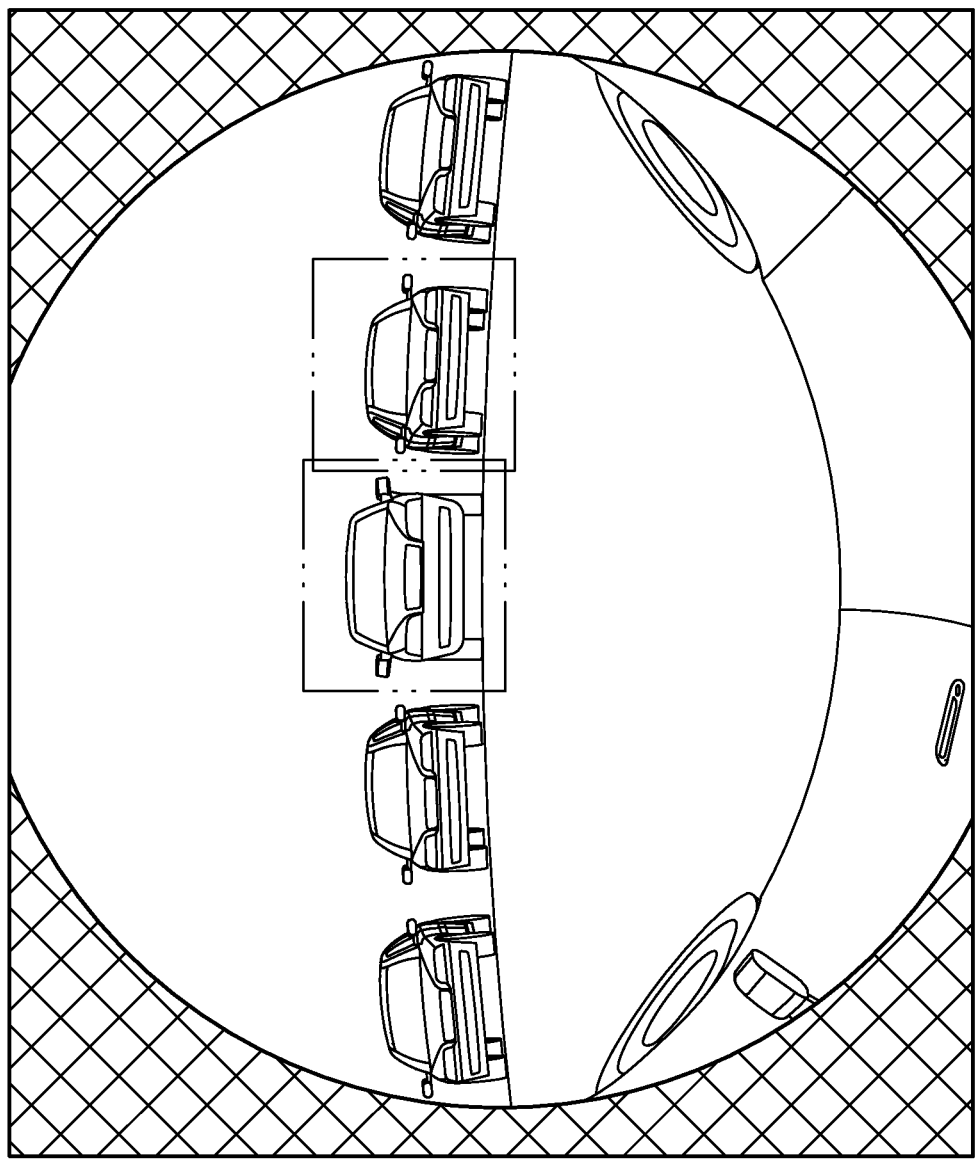
FIG. 1a is a schematic drawing illustrating a vehicle detection system using a distorted image.
Figure 1B:
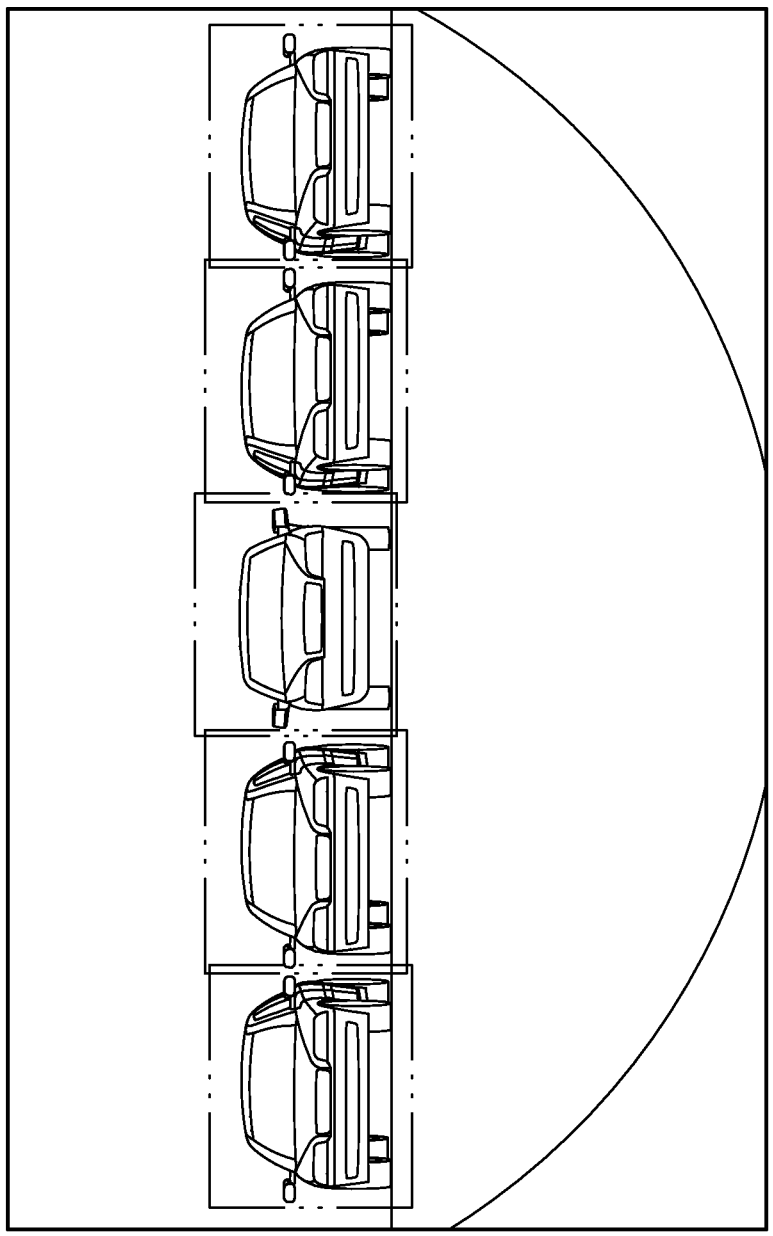
FIG. 1b is a schematic drawing illustrating a vehicle detection system using an undistorted image.
Figure 2:
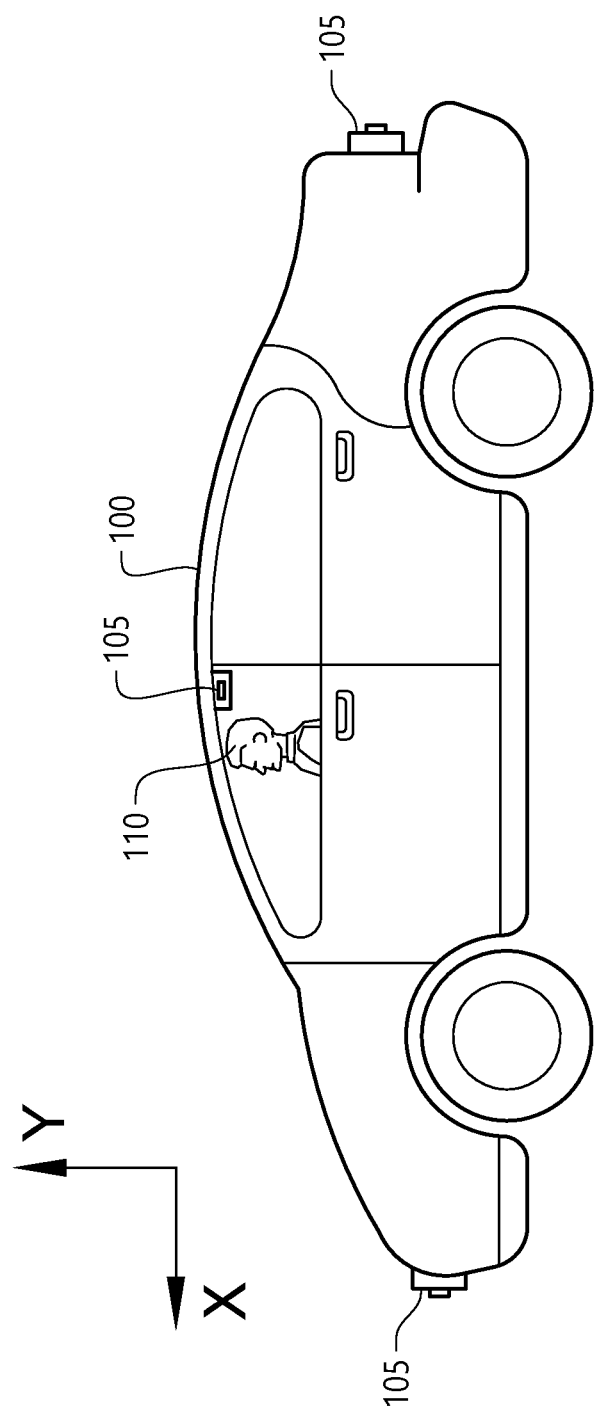
FIG. 2 is a schematic drawing illustrating a vehicle.

FIG. 2 is a schematic drawing illustrating a vehicle 100. The vehicle 100 may be any arbitrary vehicle, for instance a car, truck, lorry, van, bus, motorcycle etc. The vehicle 100 may be at least partly autonomous or self-driven, it may be completely autonomous or self-driven, or it may be non-autonomous etc.

The vehicle 100 comprises at least one image capturing device 105. FIG. 2 illustrates an example where the vehicle 100 comprises three image capturing devices 105, but any other suitable number of image capturing devices 105 is applicable. In FIG. 2, the image capturing devices 105 are located at the front of the vehicle 100, at one side of the vehicle 100 and at the back of the vehicle 100. Thus, the image capturing devices 105 may be referred to as being forward looking, sideways looking and backwards looking. The image capturing device 105 comprises a fisheye lens and may be also referred to as a fisheye camera or a camera comprising a fisheye lens, a 360 degree camera or an ultra-wide angle camera. The image capturing device 105 may be adapted to capture an image of at least 180 degrees of the surroundings of the vehicle 100. In some embodiments, the image capturing device 105 may be adapted to capture an image of 360 degrees of the surrounding of the vehicle 100.

Recall that a fisheye lens may produce strong visual distortion in obtained images intended to create a fisheye image, a wide panoramic or hemispherical image. Fisheye lenses achieve extremely wide angles of view in the obtained images. Instead of images with straight lines of perspective (rectilinear images) obtained by rectilinear lenses, fisheye lenses use a certain mapping, which gives images a characteristic convex non-rectilinear appearance.

A user 110 of the vehicle 100 may be referred to as a vehicle operator, a passenger, an occupant, a driver etc.

The vehicle 100 comprises at least one vehicle system (not shown). One such vehicle system may be a system for handling images of surroundings of the vehicle 100. Another such system may be a processing system, a brake system, a steering system etc.

The method performed by the vehicle system for handling images of surroundings of a vehicle 100, according to some embodiments will now be described with reference to the flowchart depicted in FIG. 3. The method performed by the vehicle system comprises at least one of the following steps, which steps may as well be carried out in another suitable order than described below.

Step 301

The vehicle system obtains an image 400 of surroundings of the vehicle 100. The image 400 is obtained from at least one image capturing device 105 mounted in or on the vehicle 100. The image capturing device 105 comprises a fisheye lens, and therefore the obtained image may be referred to as a fisheye image. The image 400 may be obtained by receiving it from the image capturing device 105. In another embodiment, the image capturing device 105 captures the image 400 and stores it in a memory, and then the vehicle system obtains the image 400 from the memory. The image may be obtained upon request from the vehicle system, on regular basis, or continuously.

The obtained image 400 comprises distortions. The image 400 may be of at least 180 degrees of the surroundings of the vehicle 100. The image capturing device 105 may be a fisheye camera.

Step 302

The vehicle system corrects at least a part of the distortions in the image 400 to obtain a corrected image.

The correcting may also be referred to as dewarping or base dewarping. A base dewarp may be carried out by any appropriate camera calibration algorithms or models executed by the vehicle system that obtains the mapping from warped coordinates to dewarped coordinates, as well as the intrinsic parameters of the image capturing device 105. Dewarping may be described as correcting the obtained image 400 to reverse effects of geometric distortions caused by the image capturing device 105, e.g. the fisheye lens of the image capturing device 105.

Step 303

The vehicle system rotationally transforms the corrected image using a first rotational transformation to obtain a first transformed image 403.

Step 304

The vehicle system rotationally transforms the corrected image using a second rotational transformation to obtain a second transformed image 405. The first and second rotational transformations are different from each other. The first and second transformed images 403, 405 are consecutive images. The term consecutive images may refer to images that are following, sequential, serial, succeeding etc. For example, the first transformed image 403 and the second transformed image 405 are consecutive in that the first transformed image 403 represents the right part of the obtained image and the second transformed image 405 represents the left part of the obtained image. When the two transformed images 403, 405 are placed together they may form one image which corresponds to the obtained image, but instead it provides an undistorted image.

The first transformed image 403 may be mapped on one planar surface and the second transformed image 405 may be mapped on another planar surface, as illustrated in FIG. 4a and FIG. 4b. The two planar surfaces may be located next to each other, i.e. they are consecutive surfaces. FIG. 4a illustrates a three dimensional (3D) view of the two fold form/pattern. FIG. 4b also illustrates the 3D view of the two fold form/pattern in another view than in FIG. 4a.

Steps 303 and 304 may be referred to as a 2-fold mapping where two rotational transformations are applied separately after the base dewarp. This generates two different views. The amount of rotation applied in the rotational transform is set such that the dewarped images look natural and as if they are captured by two cameras facing different directions or having different orientation. The structure of the 2-fold is demonstrated in 4a and 4b.

Step 305

The vehicle system may remove redundant overlapping areas from at least one of the first and second transformed images 403, 405.

Step 305 may also be described as applying appropriate cropping to remove part of redundant overlapping areas between the first and second transformed images 403, 405. This step may also remove a part of highly distorted areas (usually at the edges of the views). Some overlapping areas may be preserved between the first and second transformed images 403, 405 to allow for potential stitching/porting of algorithm results between the first and second transformed images 403, 405.

The first and second transformed images 403, 405 (possibly also after removal of the redundant overlapping areas) may also be referred to as resulting undistorted dewarped images. The resulting undistorted dewarped images allow for more natural and understandable views towards at least two directions defined by planar surfaces for human beings (especially user 110 in the vehicle 100).

Step 306

The vehicle system may provide the first and second transformed images 403, 405 as input to another vehicle system for further processing. Such other vehicle system may be for example an autonomous driving system, a lane detection system, a vehicle detection system etc.

The first and second transformed images 403, 405 allow for "general" machine learning/computer vision algorithms/models being applied the vehicle system or by other vehicle systems. Here, "general" algorithms/models may refer to those designed for and/or trained on images that are usually captured by normal cameras, i.e. non-fisheye/non-omnidirectional cameras.

Step 307

The vehicle system 10 may display at least one of the first and second transformed images 403, 405 to a user 110 of the vehicle 100. In one embodiment, all transformed images 403, 405 may be displayed on a display in the vehicle 100 at the same time. In another embodiment, one image 403, 405 may be displayed at the time, and the user 110 may then be able to switch between the different images.

Figure 5:
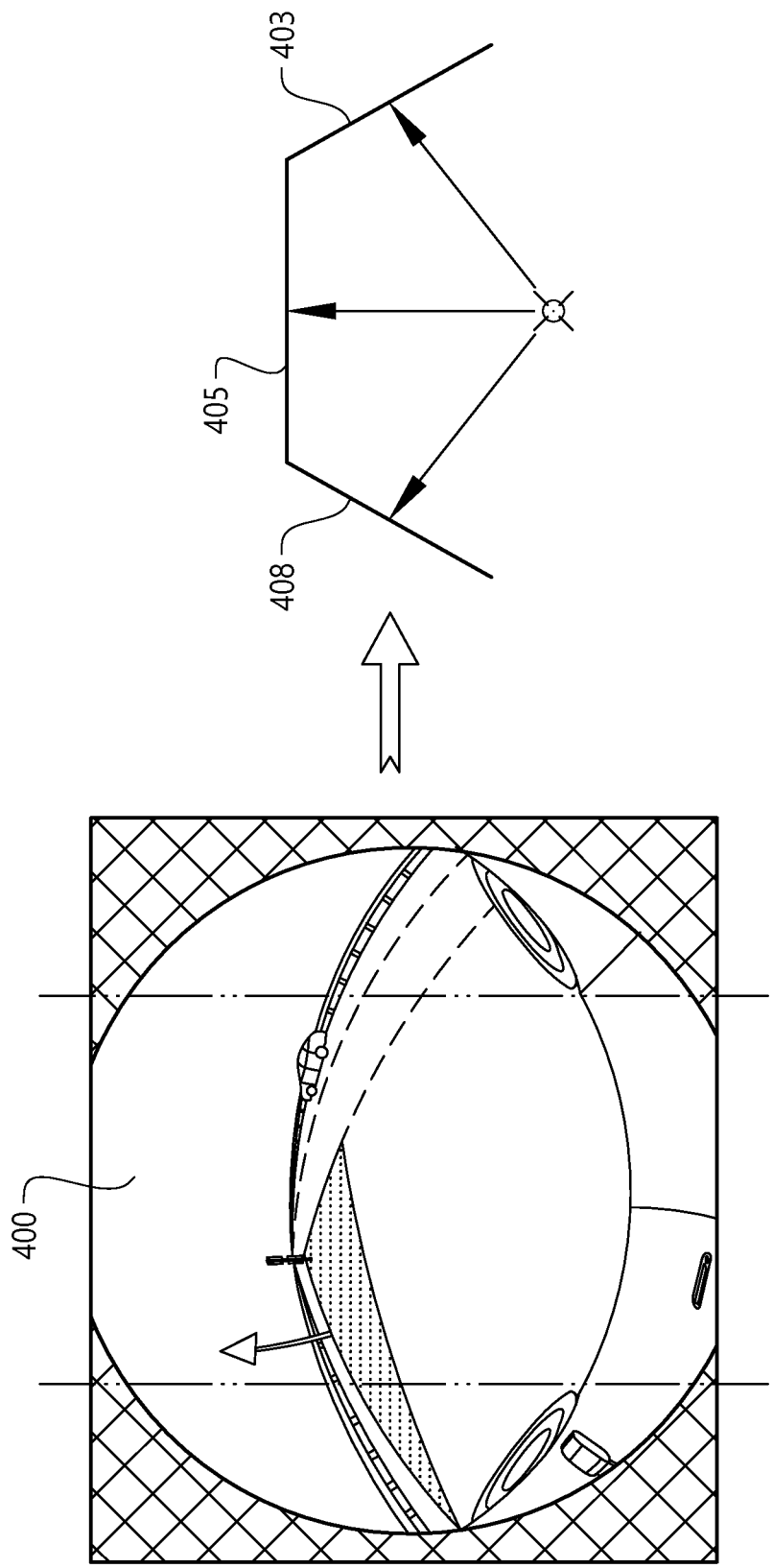
FIG. 5 is a schematic drawing illustrating a 3-fold form/pattern.

The method in FIG. 3 is described with at least two rotational transformations. FIG. 5 illustrates an example with three rotational transformations. In other words, FIG. 5 illustrates how a 2D image captured by a 360-degree fisheye lens camera 105 is mapped onto three planar surfaces. The three rotational transformations provide a first transformed image 403, a second transformed image 405 and a third transformed image 408. The vehicle system rotationally transforms the corrected image using a third rotational transformation to obtain the third transformed image 408. The first, second and third rotational transformations are different from each other. The first, second and third transformed images 403, 405, 408 are consecutive images. The left part of FIG. 5 illustrates the obtained image 400, i.e. the original view with the dashed lines indicating the splitting of the 3-folds. The right part of FIG. 5 illustrates the three transformed images 403, 405, 408, i.e. the top view of the formation of the three planar surfaces.

Figure 6:
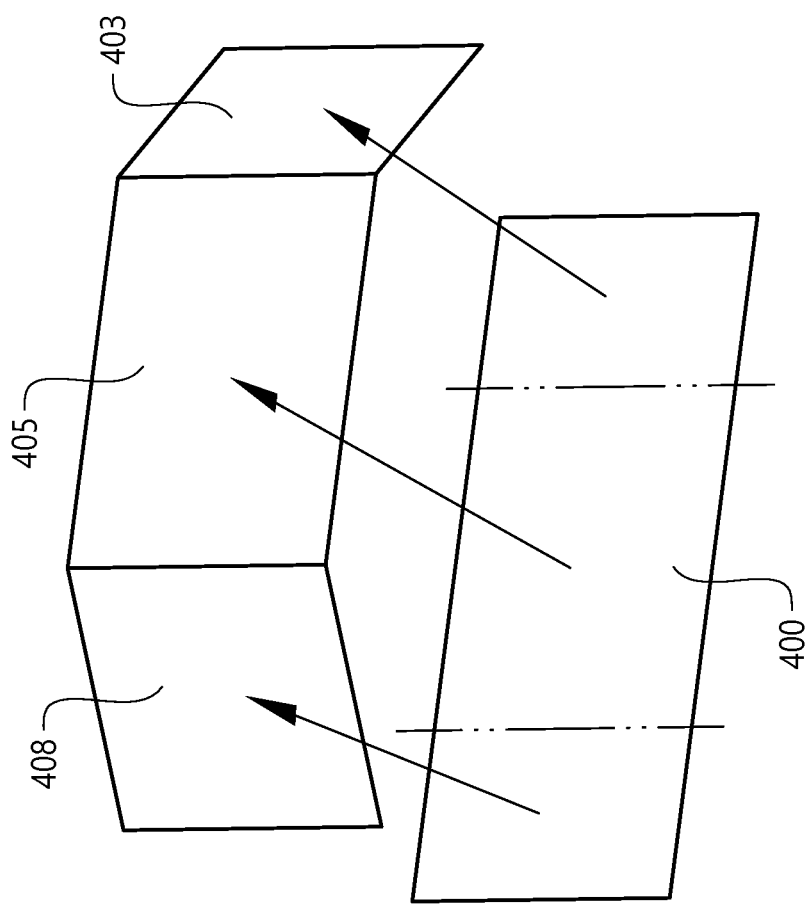
FIG. 6 is a schematic drawing illustrating a 3-fold form/pattern

FIG. 6 presents the 3-fold pattern in 3D for in another way compared to FIG. 5. Thus, FIG. 6 illustrates the same as FIG. 5 using a different illustration.

Figure 7A:
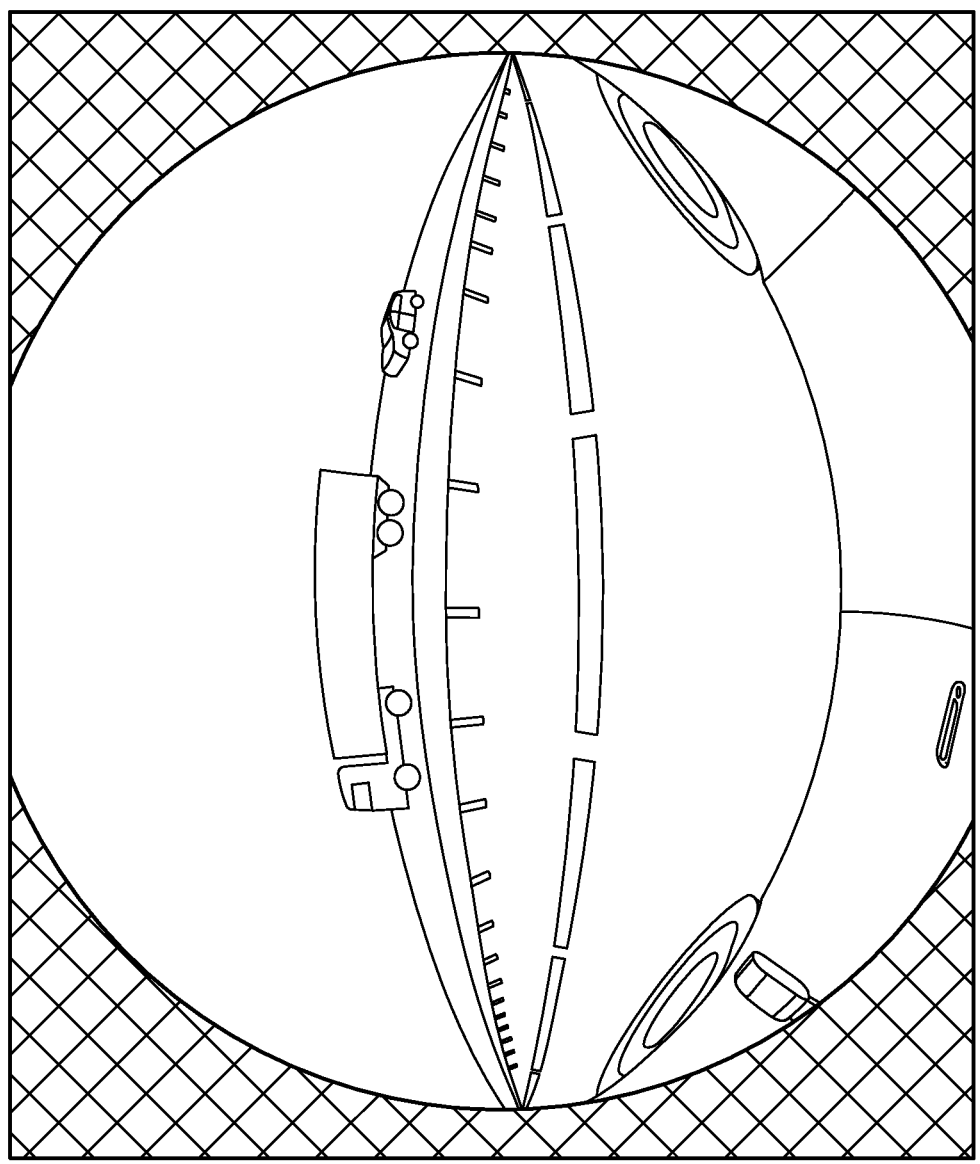
FIG. 7a, 7b are schematic drawings illustrating embodiments of an image.
Figure 7B:
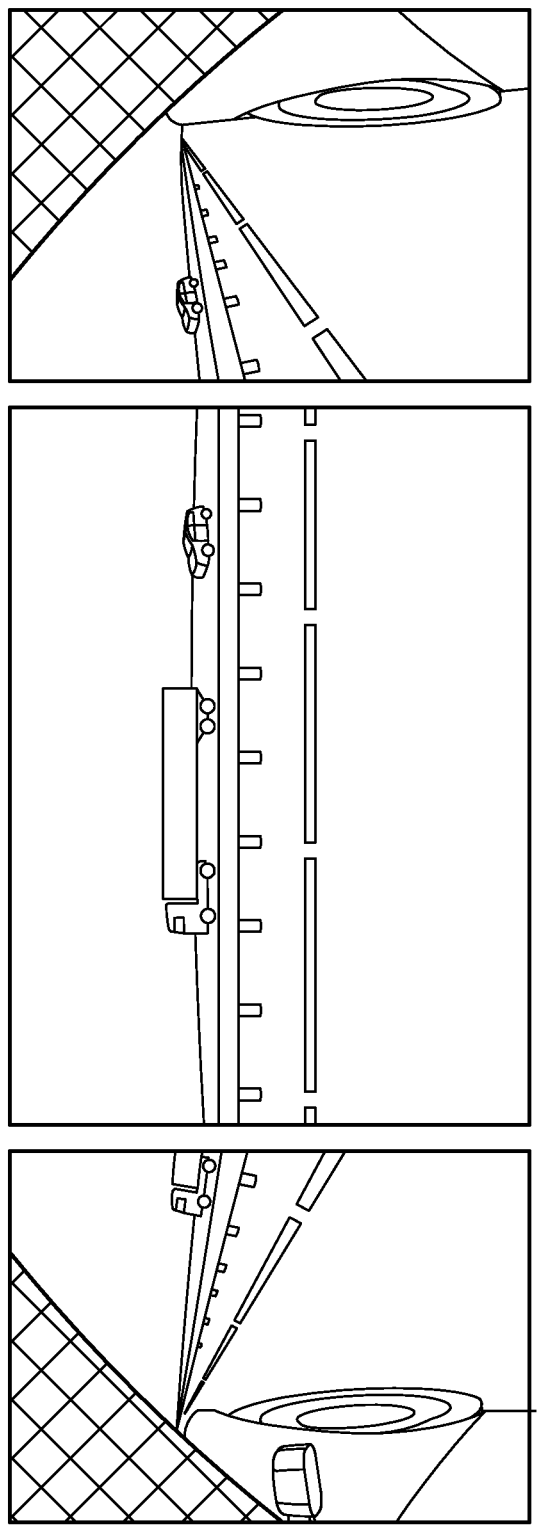
Figure 8A:
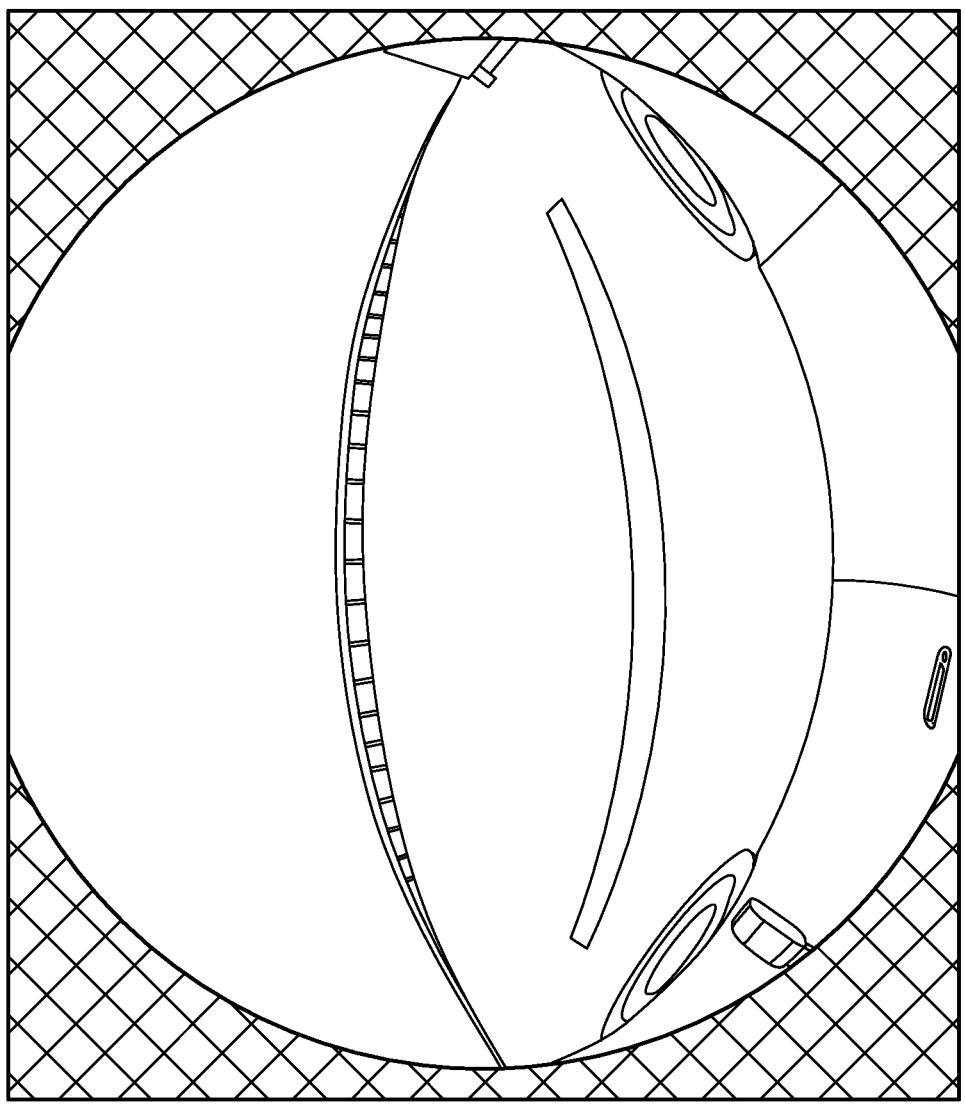
FIG. 8a, 8b are schematic drawings illustrating embodiments of an image.
Figure 8B:
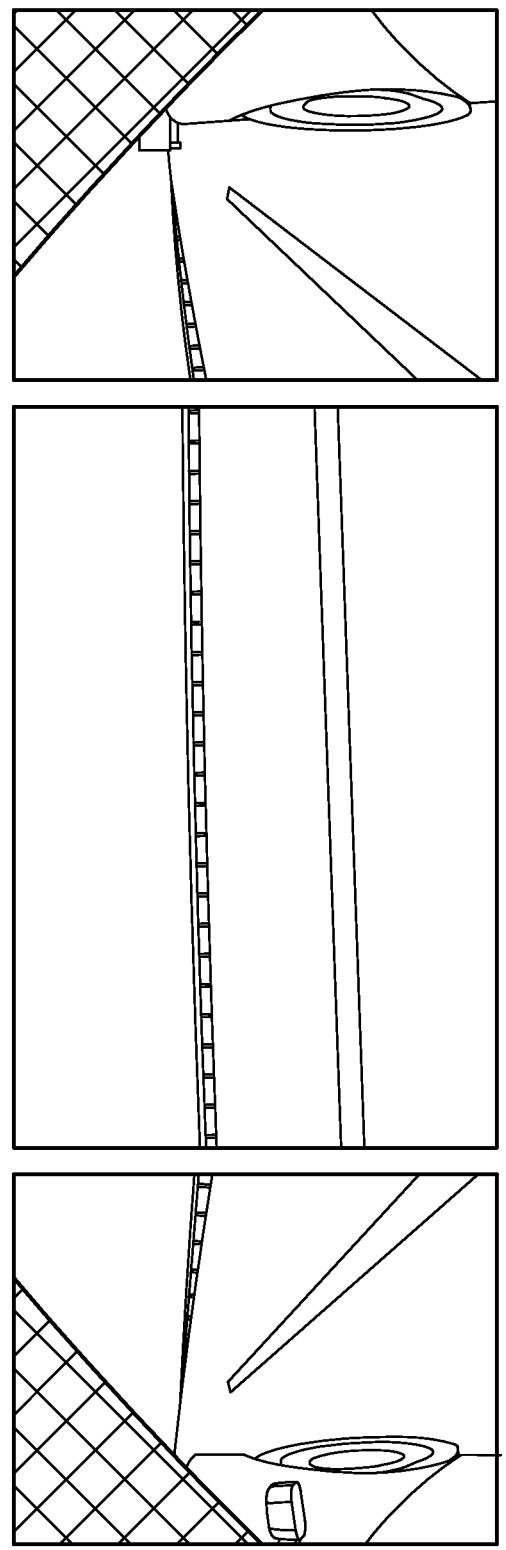

FIGS. 7a, 7b, 8a and 8b illustrate examples of resulting images. The figures illustrate images taken from a left-facing image capturing device 105 mounted in or on a vehicle 100 going on an expedition on highway. The image capturing device 105 is exemplified with a 360-degree fisheye lens camera. FIGS. 7a and 7b illustrates the result of applying the 3-fold dewarping. FIG. 7a is the original input image captured by a 360-degree fisheye lens camera 105. FIG. 7b illustrates the 3 resulting images that are mapped onto 3 planar surfaces. FIGS. 8a and 8b illustrate another such result. FIG. 8a is the original input image captured by a 360-degree fisheye lens camera 105. FIG. 8b illustrates the 3 resulting images that are mapped onto 3 planar surfaces.

The original images before 3-fold dewarp (before step 302-307) are shown in FIGS. 7a and 8a. FIGS. 7b and 8b illustrate the images after the dewarp (after step 304, and possibly also after step 305). In FIGS. 7b and 8b, the left and right images synthesize the view of forward and backward facing cameras, which gives human drivers a better sense of position and direction, compared to previously distorted area at the edge. It can be clearly seen that the images in FIGS. 7b and 8b are much more intuitive for humans after the dewarp.

In both FIGS. 7a and 8a, the lane markings are highly distorted, whereas they are undistorted in FIGS. 7b and 8b. The curved lane markings are corrected to be straight, and this is desired and will improve the performance of other vehicle systems such as e.g. autonomous driving system (in this case, lane detection) that utilize these images. Also to be noticed is that in the right image of FIG. 8a the previously sideway rotated truck is now upright positioned, which in this case helps vehicle detection systems.

The embodiments herein aim at achieving undistorted images without losing much field-of-view of the image capturing device 105, so that they can be better used by both human beings (e.g. users 110) and vehicle systems (AI/machine learning/computer vision algorithms for ADAS and AD).

The embodiments relate to computer vision for a vehicle 100, more specifically, an image processing method that benefits both human driver and computer systems for autonomous driving vehicles.

Steps 302, 303 and 304 will now be described in more detail using three rotational transformations as an example:

Step 302

The base dewarp may be described as the process of estimating a set of intrinsic related parameters K, ξ, and D, as well as extrinsic related parameters r and t, from a set of images containing calibration pattern such as a chessboard. Here, K is a generalized image capturing device matrix, ξ is a single value parameter, D comprises the distortion coefficients, and r and t characterize rotations and translations between the set of images and the image capturing device 105, respectively. K, ξ, and D are used to undistort the images taken by the image capturing device 105. The image capturing device matrix for the rectified images $K_{new}$ is usually a scaled identity matrix.

Steps 303 and 304

Rotational transform is applied after the base dewarp in step 302, by multiplying a rotational matrix R with the image capturing device matrix for rectified images $K_{new}$:

$$K_R = K_{new} \cdot R$$

The new image capturing device matrix $K_R$ replaces $K_{new}$, and is used together with previous K, ξ and D to obtain the rotated view of undistorted images (i.e. the first, second and third transformed images 403, 450, 408).

Here, the rotational transform can be decomposed into 3 rotational transforms around x (horizontal), y (vertical), and z (optical axis of the fisheye lens in the image capturing device 105) axis.

$$R = R_z R_y R_x$$

$$R_x = \begin{bmatrix} 1 & 0 & 0 \\ 0 & \cos\theta_x & -\sin\theta_x \\ 0 & \sin\theta_x & \cos\theta_x \end{bmatrix}$$

$$R_y = \begin{bmatrix} \cos\theta_y & 0 & \sin\theta_y \\ 0 & 1 & 0 \\ -\sin\theta_y & 0 & \cos\theta_y \end{bmatrix}$$

$$R_z = \begin{bmatrix} \cos\theta_z & -\sin\theta_z & 0 \\ \sin\theta_z & \cos\theta_z & 0 \\ 0 & 0 & 1 \end{bmatrix}$$

For the left fold among the 3 fold dewarps (the angles are in radians):

$$\theta_x = 0$$

$$\theta_y \in [0.65, 0.95]$$

$$\theta_z \in [0.4, 0.7]$$

For the center fold among the 3 fold dewarps (the angles are in radians):

$$\theta_x \in [0, 0.3]$$

$$\theta_y = 0$$

$$\theta_z = 0$$

For the right fold among the 3 fold dewarps (the angles are in radians):

$$\theta_x = 0$$

$$\theta_y \in [-0.95, -0.65]$$

$$\theta_z \in [-0.7, -0.4]$$

Figure 9:
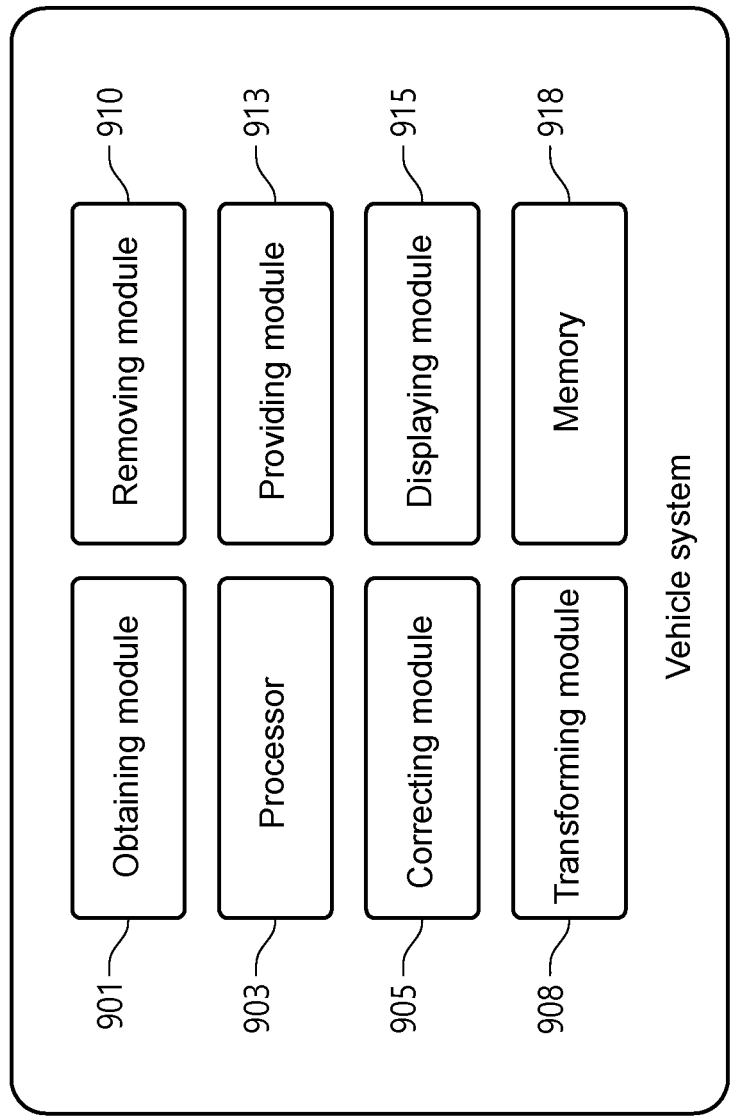
FIG. 9 is a schematic drawing illustrating embodiments of a vehicle system.

To perform the method steps shown in FIG. 3 for handling images of surroundings of a vehicle 100, the vehicle system may comprise an arrangement as shown in FIG. 9.

The vehicle system is adapted to, e.g. by means of an obtaining module 901, obtain an image of surroundings of the vehicle 100. The image is obtained from at least one image capturing device 105 mounted on the vehicle 100. The image capturing device 105 comprises a fisheye lens. The image may be of at least 180 degrees of the surroundings of the vehicle 100. The image capturing device 105 may be a fisheye camera. The obtaining module 901 may also be referred to as an obtaining unit, an obtaining means, an obtaining circuit, means for obtaining etc. The obtaining module 901 may be or comprised in a processor 903 of the vehicle system. In some embodiments, the obtaining module 901 may be referred to as a receiving module.

The vehicle system is adapted to, e.g. by means of a correcting module 905, correct at least a part of distortions in the image to obtain a corrected image. The correcting module 905 may also be referred to as a correcting unit, a correcting means, a correcting circuit, means for correcting etc. The correcting module 905 may be or comprised in the processor 903 of the vehicle system.

The vehicle system is adapted to, e.g. by means of a transforming module 908, rotationally transform the corrected image using a first rotational transformation to obtain a first transformed image. The transforming module 908 may also be referred to as a transforming unit, a transforming means, a transforming circuit, means for transforming etc. The transforming module 908 may be or comprised in the processor 903 of the vehicle system.

The vehicle system is adapted to, e.g. by means of the transforming module 908, rotationally transform the corrected image using a second rotational transformation to obtain a second transformed image. The first and second rotational transformations are different from each other, and the first and second transformed images are consecutive images. The first transformed image may be mapped on one planar surface and the second transformed image is mapped on another planar surface.

The vehicle system may be adapted to, e.g. by means of a removing module 910, remove redundant overlapping areas from at least one of the first and second transformed images. The removing module 910 may also be referred to as a removing unit, a removing means, a removing circuit, means for removing etc. The removing module 910 may be or comprised in the processor 903 of the vehicle system.

The vehicle system may be adapted to, e.g. by means of a providing module 913, provide the first and second transformed images as input to another vehicle system for further processing. The providing module 911 may also be referred to as a providing unit, a providing means, a providing circuit, means for providing etc. The providing module 913 may be or comprised in the processor 903 of the vehicle system. In some embodiments, the providing module 913 may be referred to as a transmitting module.

The vehicle system may be adapted to, e.g. by means of a, e.g. by means of a displaying module 915, display at least one of the first and second transformed images to a user 110 of the vehicle 100. The images may be displayed on a display in the vehicle 100. The displaying module 915 may also be referred to as a displaying unit, a displaying means, a displaying circuit, means for displaying etc. The displaying module 915 may be or comprised in the processor 903 of the vehicle system.

In some embodiments, the vehicle system comprises the processor 903 and a memory 918. The memory 918 comprises instructions executable by the processor 903. The memory 918 comprises one or more memory units. The memory 918 is arranged to be used to store data, received data streams, power level measurements, images, parameters, distortion information, transformation information, vehicle information, vehicle surrounding information, threshold values, time periods, configurations, schedulings, and applications to perform the methods herein when being executed by the vehicle system.

A vehicle 100 may comprise the vehicle system as described above.

The embodiments herein for handling images of surroundings of a vehicle 100 may be implemented through one or more processors, such as a processor 903, in the vehicle system arrangement depicted in FIG. 9, together with computer program code for performing the functions of the embodiments herein. The processor may be for example a Digital Signal Processor (DSP), Application Specific Integrated Circuit (ASIC) processor, Field-programmable gate array (FPGA) processor or microprocessor. The program code mentioned above may also be provided as a computer program product, for instance in the form of a data carrier carrying computer program code for performing the embodiments herein when being loaded into the vehicle system. One such carrier may be in the form of a CD ROM disc. It is however feasible with other data carriers such as a memory stick. The computer program code can furthermore be provided as pure program code on a server and downloaded to the vehicle system.

A computer program may comprise instructions which, when executed on at least one processor, cause the at least one processor to carry out the method described above. A carrier may comprise the computer program, and the carrier may be one of an electronic signal, optical signal, radio signal or computer readable storage medium.

Those skilled in the art will also appreciate that the obtaining module 901, the correcting module 905, the transforming module 908, the removing module 910, the providing module 913 and the displaying module 915 described above may refer to a combination of analog and digital circuits, and/or one or more processors configured with software and/or firmware, e.g. stored in a memory, that when executed by the one or more processors such as the processor 903 perform as described above. One or more of these processors, as well as the other digital hardware, may be included in a single application-specific integrated circuit (ASIC), or several processors and various digital hardware may be distributed among several separate components, whether individually packaged or assembled into a system-on-a-chip (SoC).

The following terminologies are used interchangeable herein: "dewarping", "undistortion", and "mapping". They all describe the process of some geometric transformation of an image, usually from the two-dimensional (2D) images captured by the image capturing device 105 to at least two planar images that do not have distortion effects introduced by the image capturing device 105.

"Computer vision and machine learning algorithms" refers to general algorithms that use images captured by the image capturing device 105 as input, and output decisions that are relevant for ADAS and/or AD, based on machine learning/artificial intelligence technology. Some examples are lane detection, pedestrian detection, vehicle detection, distance measurement, etc.

Directions as used herein, e.g. horizontal, vertical, lateral, relate to when the vehicle system is mounted in the vehicle 100, which stands on flat ground. The vehicle system may be manufactured, stored, transported and sold as a separate unit. In that case, the directions may differ from when mounted in the vehicle 100.

The embodiments herein are not limited to the above described embodiments. Various alternatives, modifications and equivalents may be used. Therefore, the above embodiments should not be taken as limiting the scope of the embodiments, which is defined by the appending claims. A feature from one embodiment may be combined with one or more features of any other embodiment.

It should be emphasized that the term "comprises/comprising" when used in this specification is taken to specify the presence of stated features, integers, steps or components, but does not preclude the presence or addition of one or more other features, integers, steps, components or groups thereof. It should also be noted that the words "a" or "an" preceding an element do not exclude the presence of a plurality of such elements. The terms "consisting of" or "consisting essentially of" may be used instead of the term comprising.

The term "configured to" used herein may also be referred to as "arranged to", "adapted to", "capable of" or "operative to".

It should also be emphasised that the steps of the methods defined in the appended claims may, without departing from the embodiments herein, be performed in another order than the order in which they appear in the claims.

The invention claimed is:

1. A method performed by a vehicle system for handling images of surroundings of a vehicle, the method comprising:
obtaining an image of surroundings of the vehicle, wherein the image is obtained from at least one image capturing device mounted in or on the vehicle, wherein the image capturing device comprises a fisheye lens;
correcting at least a part of distortions in the image to obtain a corrected image;
rotationally transforming the corrected image using a first rotational transformation to obtain a first transformed image; and
rotationally transforming the corrected image using a second rotational transformation to obtain a second transformed image, wherein the first and second rotational transformations are different from each other, wherein an amount of rotation applied in the first and second rotational transformations is such that it appears that the first and second transformed images are captured by separate image capturing devices facing different directions or having different orientations, and wherein the first and second transformed images are consecutive images.

2. The method according to claim 1, further comprising: removing redundant overlapping areas from at least one of the first and second transformed images.

3. The method according to claim 1, wherein the first transformed image is mapped on one planar surface and the second transformed image is mapped on another planar surface.

4. The method according to claim 1, further comprising: providing the first and second transformed images as input to another vehicle system for further processing.

5. The method according to claim 1, further comprising: displaying at least one of the first and second transformed images to a user of the vehicle.

6. The method according to claim 1, wherein the image is of at least 180 degrees of the surroundings of the vehicle.

7. The method according to claim 1, wherein the image capturing device is a fisheye camera.

8. A vehicle system for handling images, wherein the vehicle system is adapted to:
obtain an image of surroundings of the vehicle, wherein the image is obtained from at least one image capturing device mounted in or on the vehicle, wherein the image capturing device comprises a fisheye lens;
correct at least a part of distortions in the image to obtain a corrected image;
rotationally transform the corrected image using a first rotational transformation to obtain a first transformed image; and
rotationally transforming the corrected image using a second rotational transformation to obtain a second transformed image, wherein the first and second rotational transformations are different from each other, wherein an amount of rotation applied in the first and second rotational transformations is such that it appears that the first and second transformed images are captured by separate image capturing devices facing different directions or having different orientations, and wherein the first and second transformed images are consecutive images.

9. A vehicle comprising the vehicle system of claim 8.

* * * * *